United States Patent [19]

DuFresne

[11] 3,999,721
[45] Dec. 28, 1976

[54] SPINDLE HUB

[75] Inventor: Joseph B. DuFresne, Tustin, Calif.

[73] Assignee: Electronic Engineering Company of California, Santa Ana, Calif.

[22] Filed: Mar. 19, 1975

[21] Appl. No.: 560,005

[52] U.S. Cl. .............................................. 242/68.3
[51] Int. Cl.² ....................................... B65H 17/02
[58] Field of Search ............... 242/68.3, 68.2, 68.1, 242/72, 130.1, 46.6

[56] References Cited

UNITED STATES PATENTS

| 509,159 | 11/1893 | Giles | 242/72.1 |
|---|---|---|---|
| 1,179,924 | 4/1916 | Howell | 242/68.3 |
| 2,058,224 | 10/1936 | George | 242/72.1 |
| 2,221,089 | 11/1940 | Githens et al. | 242/68.3 |
| 2,254,605 | 9/1941 | Foster | 242/68.3 |
| 2,381,301 | 8/1945 | Markle, Jr. | 242/72 |
| 3,278,133 | 10/1966 | Froehlich | 242/68.3 |

*Primary Examiner*—George F. Mautz
*Attorney, Agent, or Firm*—Harry R. Lubcke

[57] ABSTRACT

A hub for driving a reel of tape, having a resiliently mounted radially expandable key for nesting in a keyway of the axial hole in the reel. The reel may be placed upon the hub in any circumferential relation with one hand and relative rotation will cause the key to move radially outward when the keyway is aligned with it. Cessation axially of the keyway at the front of the reel and a corresponding catch on the front of the key secures the reel axially upon the hub.

3 Claims, 2 Drawing Figures

SPINDLE HUB

BACKGROUND OF THE INVENTION

This invention pertains to a hub for removably retaining a surrounding member.

Particularly in the various embodiments of the tape art, a reel containing tape has been retained to a hub or driving spindle by friction. A complicated mechanism has been employed in which a front knob actuates plural expandable pressure pads. These engage the inner surface of the hole in the reel irrespective of any key and keyway action.

The drive is not positive and tends to abraid the inner surface of the hole in the reel. Such a grip is unsatisfactory as the speed of character reading increases with the constant advance in technology, as reading 750 characters per second, and a start with up to speed within 60 milliseconds after a stop.

A standard reel in tape practice has only one keyway, and so prior art which employed a plurality of fixed keys with keyways, such as three, is inapplicable.

SUMMARY OF THE INVENTION

A resiliently mounted key in a spindle hub automatically seeks out a companion axially disposed keyway in a tape reel. The keyway has limited axial extent and a latch-projection on the key bears thereagainst to retain the reel axially upon the spindle. The key-keyway structure provides positive drive for the reel. The reel can be put upon the hub with one hand can be similarly removed.

DESCRIPTION OF THE PREFERRED EMBODIMENT

Figure 1:
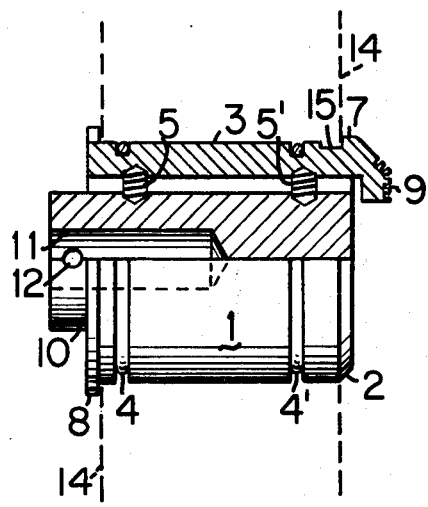
FIG. 1 is a side elevation, partly in section, of the spindle hub with the key in its radially extended position.
Figure 2:
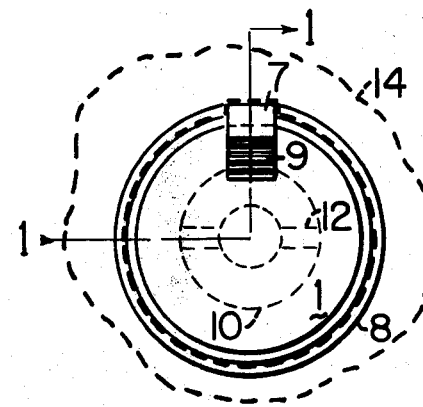
FIG. 2 is an end elevation of the spindle hub with the key also in the radially extended position and engaging the keyway of a reel, which is fragmentarily shown dotted.

In FIGS. 1 and 2, numeral 1 indicates the cylindrical body of the hub. This may be fabricated in various sizes and proportions, but a diameter of 1¼ inches (3.18 centimeters) allows the hub to support a 5¼ inch external diameter (13.3 cm) diameter tape reel known to the art. In this example the net axial length of the reel is the same as the diameter of the hole therein.

The body may be fabricated of a suitable aluminum alloy, such as the 6061-T651 of the 6000 series; or of a suitable plastic, such as polyphenylene oxide, obtainable under the trade name of Noryl. This material may be glass-filled to obtain additional hardness.

The front of the hub is shown in the foreground of FIG. 2 and at the right in FIG. 1. It is typically a screw-machine product. A chamfer 2 at the front edge of the cylinder to make attaching a reel easy is preferable.

Two circumferential slots are included in the main body of the hub. These are positioned relatively near the front and near the rear of the body, respectively. In the completed assembly each slot houses a spring ring, 4 and 4', respectively. These rings embrace nearly one full circumference and are used to retain key 3. The rings are sprung into place in making the assembly, as known.

Key 3 is retained in a slot extending the whole axial length of body 1. It is shown in the radially expanded position in FIG. 1. The reel may be pushed onto the hub at any relative circumferential position and then key 3 will only extend radially as far out as the inner diameter of the hole in the reel.

With the depressed position of the key, spring rings 4 and 4' hang loose in the lower part of their respective slots, but the proportions are such that the rings do not protrude beyond the body diameter of the hub; such a condition would preclude easy mounting of the reel.

The key is urged outward to its normal rest position by plural resilient means, such as compression coil springs 5 and 5'. These are located in holes in the body of limited depth, having radial axes under the key and aligned therwith. The force exerted by the springs is such as to allow the key to be depressed when a reel is placed on the hub with one hand, and to expand it into the keyway of the reel as soon as circumferential alignment of the key and the keyway takes place. This positioning is shown accomplished in FIG. 2.

Body 1 is formed with flange 8 at the rear. This forms an axial stop to the position of the reel, against which catch projection 7 forces the reel into a desired prearranged axial position and retains it there until such time as key 3 is manually depressed to remove the reel. The manual operation is best accomplished by pushing downward toward the axis of the hub with the thumb or a finger engaging the ridged forward extremity 9 of the key.

Key 3 is conveniently fabricated in the form of an extrusion having the same cross-section as the longitudinal section thereof shown in FIG. 1. Each key is then produced by merely cutting off a piece of the extrusion at the end thereof in a plane perpendicular to the length of the extrusion. The amount cut off is made equal to the width of the finished key, as ¼ inch (0.635) cm.

The width of the known reel is equal to the distance from the inner lip of catch projection 7 to the inner, front, face of flange 8.

A rear hub 10 is typically formed behind the flange and a central axial hole 11 provided. This extends halfway into the hub for engaging a drive shaft (not shown). A smaller transverse hole 12 is provided through the rear hub to pin the same to the drive shaft, in a typical embodiment.

In FIG. 2 the surrounding member, or reel, 14 is fragmentarily shown in dotted lines. It surrounds the nominally straight cylindrical portion of hub 1 and includes a keyway which receives key 3. The extreme front portion is not a keyway and the resulting lip fits into depression 15 just behind projection 7 in FIG. 1.

Simplified mounting and demounting of the reel is attained by the coaction of the resiliently supported key 3 and its forward catch projection 7 with a companion construction of the reel.

Certain variations of the embodiment heretofore set forth are possible under the invention.

Springs 5-5' may be replaced by a bowed leaf spring disposed between body 1 and the under side of key 3.

Retaining rings 4-4' may be retaining straps.

The shape of rear hub 10 may be modified from that shown and the attachment to drive means may be by threads, a force-fit square shaft, or equivalents.

The articles driven need not be a "reel". It may be a core without sides, upon which tape or an equivalent is wound, as long as the inner aperture of the core has a keyway and a lip marking the end of the keyway at the front edge of the core.

I claim:

1. A hub for removably retaining a close-fitting surrounding member (14) having a single axial keyway, said hub structured to fixedly retain said surrounding member during rapid rotational accelerations, comprising;
   a. a rigid unitary cylindrical body (1) having a single axial slot,
   b. a key (3) fitting within said axial slot,
   c. plural resilient means (5, 5') extending between said body and said key,
      to urge said key within said slot radially outward into direct contact with said surrounding member within the keyway thereof,
   d. plural spaced spring split retaining rings (4), each having fixed cross-sections, and each loosely substantially surrounding, directly, said body and said key,
      to retain said key to said body in the absence of said surrounding member (14),
   e. a fully circumferential flange (8) rearwardly positioned upon said cylindrical body, and
   f. a forward radially-outward catch projection (7) upon said key (3),
      said flange (8) and said projection (7) axially spaced to axially fix said surrounding member (14) upon said cylindrical body (1).

2. The hub of claim 1, in which;
   a. said cylindrical body (1) and said key (3) are fabricated of a hard heat treated aluminum alloy.

3. The hub of claim 1, in which;
   a. said cylindrical body (1) is fabricated of a glass-filled polyphenylene oxide.

* * * * *